June 5, 1951 C. S. DAVIS 2,555,921
FLEXIBLE COUPLING
Filed Aug. 20, 1948 2 Sheets-Sheet 1
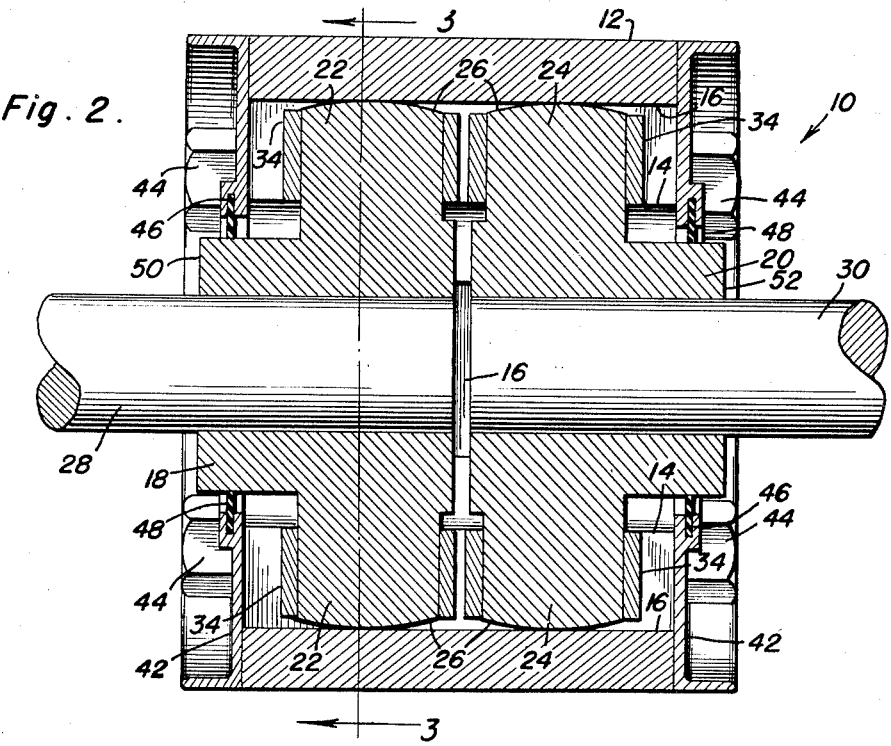
Fig. 2.
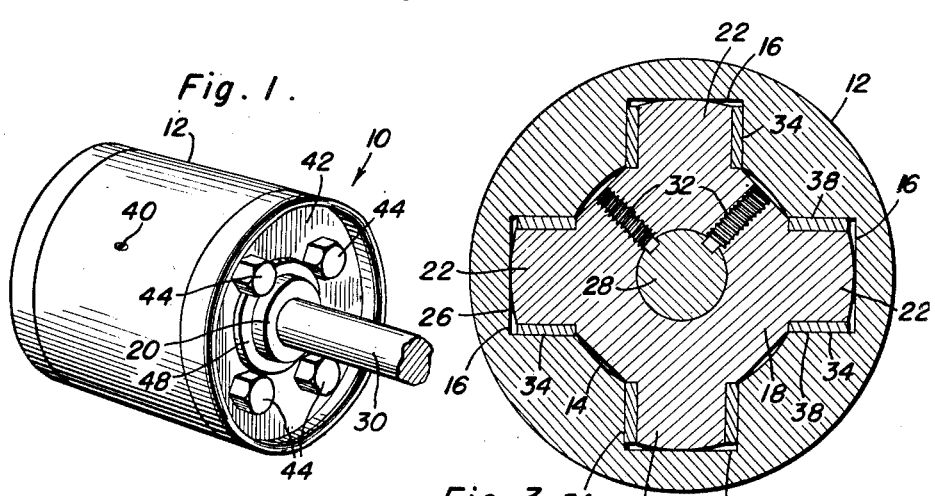
Fig. 1.
Fig. 3.
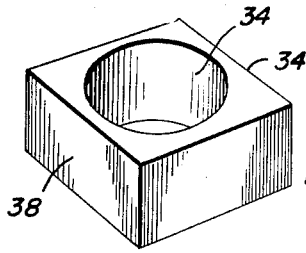
Fig. 4.
Cleatus S. Davis
INVENTOR.
BY *Clarence A. O'Brien*
*and Harvey B. Jackson*
Attorneys June 5, 1951

C. S. DAVIS 2,555,921

FLEXIBLE COUPLING

Filed Aug. 20, 1948

Cleatus S. Davis
INVENTOR.

BY *Clarence A. O'Brien*
*and Harvey B. Jackson*
Attorneys

Patented June 5, 1951

2,555,921

UNITED STATES PATENT OFFICE 2,555,921

FLEXIBLE COUPLING

Cleatus S. Davis, Ontario, Calif.; Kenneth Davis executor of said Cleatus S. Davis, deceased Application August 20, 1948, Serial No. 45,308

1 Claim. (Cl. 64—9)

This invention relates to new and useful improvements and structural refinements in flexible couplings, and the principal objects of the invention are to provide a flexible coupling which is simple in construction, economical to manufacture, which will function satisfactorily for considerable periods of time without repair, and which will facilitate an efficient operative connection between driving and driven shafts, either axially aligned or disposed in an angular relationship.

These objects are achieved by the provision of a flexible coupling which embodies in its construction a housing formed with a bore and longitudinal channels in the wall of the bore, and driving and driven spiders movably but non-rotatably positioned in the bore, these spiders including radially projecting trunnions which extend into the channels of the bore so that the spiders "float," so to speak, in the housing and transmission of power between driving and driven shafts to which the spiders are secured is thus facilitated.

An important feature of the invention resides in the provision of what may be referred to as flat-surfaced bushings on the trunnions of the spiders, which bushings slidably engage the channels in the housing and, by virtue of their flat surfaces, provide relatively greater bearing areas than have heretofore been provided in flexible couplings of conventional types. These bearing areas remain constant in the instant coupling, regardless of the extent of misalignment between driving and driven shafts, so that wear is equalized and the life of the coupling is substantially increased.

Another feature of the invention resides in the provision of flexible closure means in the form of oil seals for retaining lubricant in the coupling.

With the above more important objects and features in view and such other objects and features as may become apparent as this specification proceeds, the invention consists essentially in the arrangement and construction of parts as illustrated in the accompanying drawings, in which:

Figure 1 is a perspective view of the invention;

Figure 2 is a longitudinal cross sectional view thereof, showing the driving and driven shafts axially aligned;

Figure 3 is a cross sectional view, taken substantially in the plane of the line 3—3 in Figure 2;

Figure 4 is a perspective view of a bushing used in the invention;

Figures 5, 6, 7:
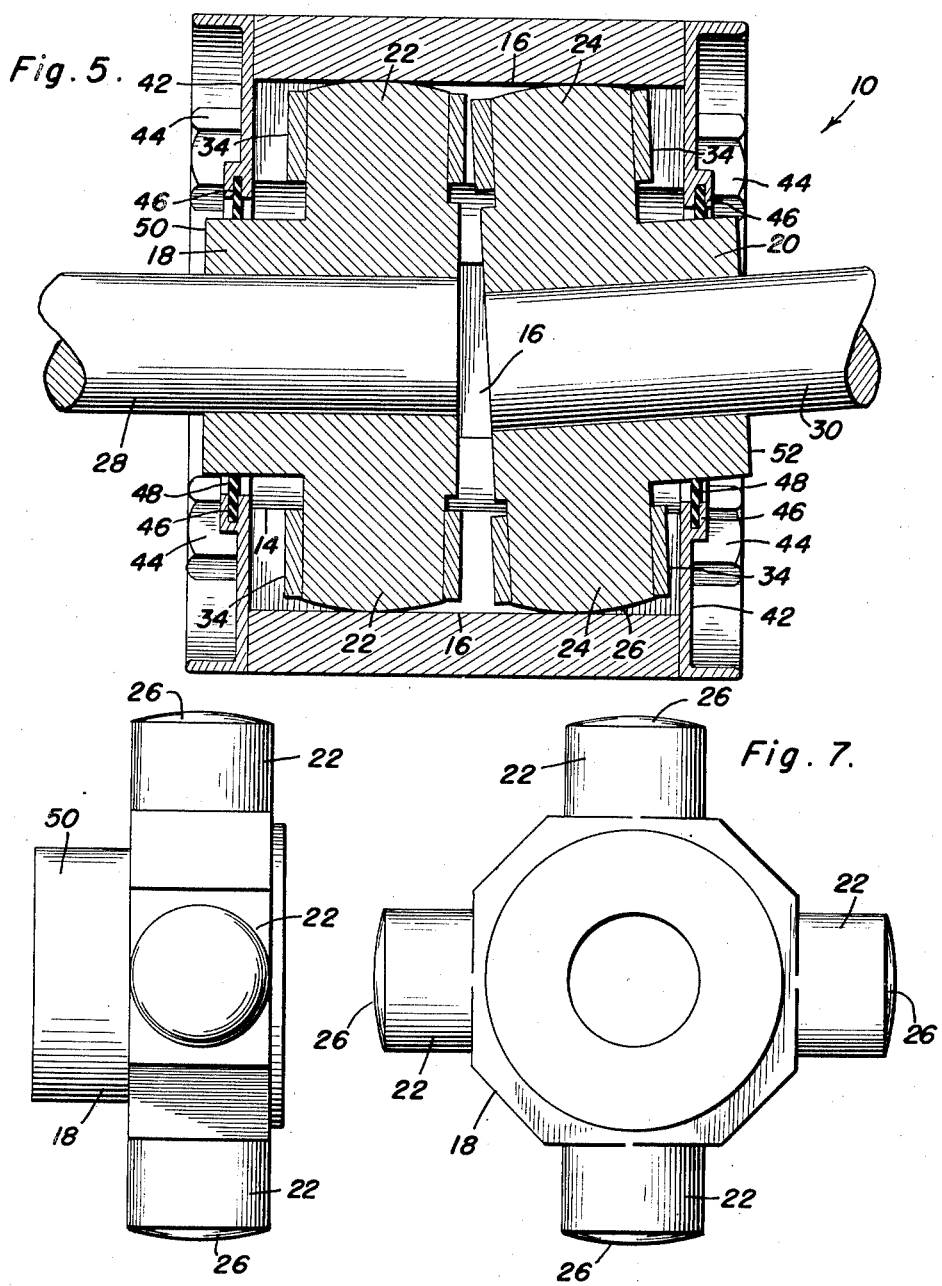
Figure 5 is a longitudinal cross sectional view, similar to that shown in Figure 2 but illustrating the driving and driven shafts in an angularly offset relation.
Figure 6 is a side elevational view of one of the spiders used in the invention.
Figure 7 is an elevational view of the spider shown in Figure 6.

Referring now to the accompanying drawings in detail, the invention consists of a flexible coupling designated generally by the reference character 10, the same embodying in its construction a substantially cylindrical housing 12 provided with an axial bore 14 and formed in the lateral wall of said bore with a plurality of longitudinally extending channels 16, as is best shown in Figures 2, 3 and 5.

A pair of spiders 18, 20 are movably but non-rotatably positioned in the bore 14 of the housing 12, these spiders including radially projecting trunnions 22, 24, respectively, which extend into the channels 16, as illustrated in Figure 3.

The trunnions 22, 24, are substantially cylindrical and are provided with substantially spherical end surfaces, as illustrated at 26, which permit the entire spiders to "float," so to speak, in the housing 12, as illustrated in Figures 2 and 5. It should, of course, be understood that the spiders 18, 20 are provided with suitable bores to receive driving and driven shafts shown at 28, 30, respectively, suitable set screws 32 being employed for rigidly securing the spiders on their respective shafts, as illustrated in Figure 3.

Each of a plurality of bushings 34 is provided on one of the trunnions 22, 24 of the spiders 18, 20, the bushings 34 assuming the form of substantially rectangular blocks formed with apertures 36 to slidably and rotatably accommodate these trunnions, as will be clearly apparent.

It is to be noted that the bushings 34 have flat opposite side surfaces 38, as illustrated in Figures 3 and 4, which flat side surfaces are in radial and longitudinal sliding engagement with side walls of the channels 16 of the housing 14 and facilitate floating of the spiders 18, 20 in the housing while the shafts 28, 30 undergo changes in their angular relationship when the joint is in operation. Moreover, the thickness of the bushings is less than the length of the trunnions, whereby the bushings may slide radially on the trunnions as well as radially in the channels 16, thus permitting the spiders 18, 20 to pivot independently about all axes perpendicular to the axis of the bore 14. Needless to say, the flat surfaces 38 of the bushings 34 provide substantial bearing areas so that the wear and tear of the flexible coupling is greatly minimized and the coupling, when properly lubricated, is capable of functioning satisfactorily for considerable periods of time without repair.

Suitable lubricant may be injected into the housing 12 upon removal of a suitable filler plug 40 with which the housing is provided (see Figure 1), and means are also provided for retaining the lubricant in the housing, as will be presently described.

These grease retaining means assume the form of a pair of end plates 42 secured to the housing 12 at the ends of the bore 14 by suitable bolts or screws 44, the plates 42 having central openings formed with thickened edges in order to accommodate annular grooves 46 for the reception of annular oil seals 48 formed from suitable flexible material. These oil seals frictionally engage the hub portions 50, 52 of the spiders 18, 20, respectively, whereby lubricant may be retained in the housing 12, as will be clearly understood.

It should, of course, be appreciated that the central openings in the end plates 42 are sufficiently large and the oil seals 48 are sufficiently flexible to facilitate angular deviation of the shafts 28, 30 with respect to the central axis of the housing 12 when the joint is in operation, whereby leakage of lubricant outwardly through the seals 48 is prevented.

It is believed that the advantages and use of the invention will be clearly understood from the foregoing disclosure, and accordingly, further description thereof at this point is deemed unnecessary.

Having described the invention, what is claimed as new is:

In a flexible coupling, the combination of a housing provided with a bore and with two pairs of diametrically opposed channels extending longitudinally in the wall of said bore, said channels having flat side and bottom walls, a spider movably but non-rotatably positioned in the bore and including two pairs of diametrically opposite trunnions projecting radially into the respective channels and having substantially spherical outer end surfaces, and rectangular bushings rotatable and slidable radially on said trunnions, said bushings having flat top and bottom and flat parallel opposite side surfaces in radial and longitudinal sliding engagement with side walls of the respective channels, the distance between the flat top and bottom of said bushings being less than the length of said trunnions whereby said spider may pivot about all axes perpendicular to the axis of said bore.

CLEATUS S. DAVIS.

REFERENCES CITED

The following references are of record in the file of this patent:

UNITED STATES PATENTS

| Number | Name | Date |
|---|---|---|
| 203,156 | Hunter et al. | Apr. 30, 1878 |
| 730,604 | Brazier | June 9, 1903 |
| 1,582,997 | McGee | May 4, 1926 |
| 2,365,772 | O'Malley | Dec. 26, 1944 |